United States Patent [19]

Itatani et al.

[11] 4,292,435

[45] Sep. 29, 1981

[54] METHOD OF PRODUCING BIPHENYLTETRACARBOXYLIC ESTERS

[75] Inventors: Hiroshi Itatani, Chiba; Akinori Shiotani, Ichihara; Akiyoshi Yokota, Ishikawa, all of Japan

[73] Assignee: Ube Industries, Ltd., Chiba, Japan

[21] Appl. No.: 151,818

[22] Filed: May 21, 1980

[30] Foreign Application Priority Data

May 21, 1979 [JP]  Japan ................................. 54-61531
Sep. 27, 1979 [JP]  Japan ............................... 54-123169

[51] Int. Cl.³ ......................................... C07C 67/343
[52] U.S. Cl. ......................................... 560/96; 546/8; 546/10
[58] Field of Search ..................... 560/96; 546/8, 10

[56] References Cited

U.S. PATENT DOCUMENTS

| | | | |
|---|---|---|---|
| 2,578,910 | 12/1951 | Uraneck | 546/10 |
| 3,654,279 | 4/1972 | Hurley et al. | 546/10 |
| 3,691,095 | 9/1972 | Kroll et al. | 546/8 |
| 3,983,159 | 9/1976 | Ichikawa | 560/96 |
| 4,008,266 | 2/1977 | Intille | 560/96 |

OTHER PUBLICATIONS

Itatani et al., J. Org. Chem., 38 (1), pp. 76–79 (1973).

*Primary Examiner*—Natalie Trousof
*Assistant Examiner*—Vera C. Clarke
*Attorney, Agent, or Firm*—Burgess, Ryan and Wayne

[57] ABSTRACT

A biphenyltetracarboxylic tetraester, especially, 3,3',4,4'-biphenyltetracarboxylic tetraalkyl ester, is produced by oxidative coupling an orthophthalic diester, especially, orthophthalic dialkylester, in a molecular oxygen-containing atmosphere in the presence of a catalyst consisting of a mixture of a palladium salt with 1,10-phenanthroline and/or 2,2'-bipyridyl or a chelating reaction product of a palladium salt with 1,10-phenanthroline or 2,2'-bipyridyl.

15 Claims, No Drawings

METHOD OF PRODUCING BIPHENYLTETRACARBOXYLIC ESTERS

FIELD OF THE INVENTION

The present invention relates to a method of producing biphenyltetracarboxylic esters. More particularly, the present invention relates to a method for producing biphenyltetracarboxylic tetraesters by catalytically oxidative coupling an orthophthalic diester.

BACKGROUND OF THE INVENTION

It is known that biphenyl compounds can be produced by oxidative coupling an aromatic compound in an oxygen-containing atmosphere in the presence of a palladium type catalyst by various methods. For example, Japanese patent application Publication (Kokoku) No. 48—1054(1973) discloses a method of producing a biphenyl compound by dehydrogenation-dimerizing (oxidative coupling) a benzene type aromatic compound in an oxygen-containing atmosphere in the presence of an organic palladium salt but in the absence of reaction medium under an increased pressure.

Also, it is known that a conventional oxidative coupling method, for example, the above-mentioned method, for the aromatic compounds, is applied to an orthophthalic ester, the resultant coupling product contains, as major components, 2,3,3',4'-biphenyltetracarboxylic tetraester (a-BPTT) and 3,3',4,4'-biphenyltetracarboxylic tetraester (S-BPTT), and usually, the amount of the a-BPTT is larger than that of the S-BPTT. However, the S-BPTT is useful as a material for producing an aromatic carboxylic dianhydride which is useful as an intermediate for producing an aromatic polyimide resin having excellent tenacity, thermal resistance and electric insulating property. Therefore, the S-BPTT is more industrially valuable than the a-BPTT. Accordingly, it is desirable to provide a new method of oxidative coupling the orthophthalic ester, which method is capable of producing the S-BPTT as a main product with a high degree of yield thereof and the a-BPTT as a by-product with a very low degree of yield thereof. It is preferable that the yield of the S-BPTT be as large as possible and the yield of the a-BPTT be as small as possible.

SUMMARY OF THE INVENTION

An object of the present invention is to provide a method of producing biphenyltetracarboxylic esters, which method is capable of producing 3,3',4,4'-biphenyltetracarboxylic tetraester with a high degree of selectivity thereto.

Another object of the present invention is to provide a method of producing biphenyltetracarboxylic tetraester, in which method the formation of a by-product, for example, 2,3,3',4'-biphenyltetracarboxylic tetraester is restricted.

The above-mentioned objects can be attained by the method of the present invention, which comprises oxidative coupling an orthophthalic diester in a molecular oxygen-containing atmosphere in the presence of a catalyst consisting of at least one member selected from the group consisting of (A) mixtures of at least one palladium salt with at least one member selected from 1,10-phenanthroline and 2,2'-bipyridyl in a molar amount of 0.9 to 4 times that of said palladium salt and (B) chelating reaction products of at least one palladium salt with at least one member selected from 1,10-phenanthroline and 2,2'-bipyridyl. In the method of the present invention, the oxidative coupling operation may be carried out by blowing a molecular oxygen-containing gas into the oxidative coupling system to bring the molecular oxygen into contact with the orthophthalic diester and the catalyst.

The method of the present invention is effective for producing S-BPTT with a high degree of selectivity thereto in such a manner that the molar ratio of the resultant a-BPTT to the resultant S-BPTT is in a range of from 0.01 to 0.6

DETAILED DESCRIPTION OF THE INVENTION

The method of the present invention is characterized in that the catalyst for oxidative coupling the orthophthalic diester consists of at least one member selected from (A) mixtures of (a) at least one palladium salt with (b) at least one member selected from 1,10-phenanthroline and 2,2'-bipyridyl in a molar amount of 0.9 to 4 times that of said palladium salt and (B) chelating reaction products of (a) at least one palladium salt with (b) at least one member selected from 1,10-phenanthroline and 2,2'-bipyridyl.

The orthophthalic diester usable for the present invention is preferably selected from those of the formula (I):

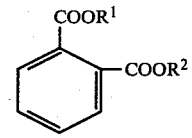

wherein $R^1$ and $R^2$ represent, independently from each other, an alkyl radical having 1 to 4 carbon atoms, respectively.

For example, the orthophthalic diester is selected from the group consisting of dimethyl o-phthalate, diethyl o-phthalate, dipropyl o-phthalate, dibutyl o-phthalate. The orthophthalic diester can be produced by reacting a corresponding hydroxy group-containing compound with orthophthalic acid or its anhydride.

The palladium salt usable for the method of the present invention can be selected from the group consisting of palladium salts of organic carboxylic acids, palladium chelate salts of $\beta$-diketone compounds, and palladium salts of inorganic acids. The palladium salt is usually selected from the group consisting of palladium salts of aliphatic carboxylic acids having 1 to 5 carbon atoms, for example, palladium formate, palladium acetate, palladium propionate, palladium butylate, and palladium valerate; palladium salts of aromatic carboxylic acids, for example, palladium benzoate, palladium terephthalate; palladium chelate salts, for example, of acetylacetone, benzoylacetone and trifluoroacetylacetone, and; inorganic palladium salts, for example, palladium nitrate, palladium nitrite and palladium sulfate. Also, the palladium salt usable for the present invention may be in the form of a complex salt, for example, palladium nitrate acetate [$Pd(NO_3)(O.COCH_3)$]. The preferable palladium salts for the present invention are palladium salts of aliphatic monocarboxylic acids having 1 to 3 carbon atoms, more preferably, palladium acetate.

When the catalyst for the method of the present invention consists of a mixture of at least one palladium salt and at least one member selected from 1,10-phenanthroline and 2,2'-bipyridyl, the total molar amount of 1,10-phenanthroline and/or 2,2'-bipyridyl is in a range of from 0.9 to 4 times, preferably, from 0.95 to 3 times, that of the palladium salt.

A total molar amount of 1,10-phenanthroline and/or 2,2'-dipyridyl less than 0.9 times that of the palladium salt, sometimes results in an oxidative coupling reaction which exhibits a poor selectivity to the S-BPTT. Therefore, the resultant product contains the S-BPTT in a smaller amount that of the a-BPTT. Also, a total molar amount of 1,10-phenanthroline and/or 2,2'-bipyridyl more than 4 times that of the palladium salt, results in a decreased yield of the resultant biphenyltetracarboxylic esters.

The catalyst of the method of the present invention may consist of a chelating reaction product of at least one palladium salt with at least one member selected from 1,10-phenonthroline and 2,2'-dipyridyl. The chelating reaction product can be prepared in such a manner that the palladium salt is mixed with 1,10-phenanthroline and/or 2,2'-bipyridyl by dissolving them in an organic solvent, for example, benzene, xylene, acetone, methylene dichloride or chlorobenzene, the solution is stirred at room temperature for a period of time between one half and ten hours to complete the chelating reaction, and then, the resultant product is isolated from the reaction mixture by removing the organic solvent.

In the chelating reaction, it is preferable that the molar ratio of the palladium salt to the sum of 1,10-phenanthroline and/or 2,2'-bipyridine be in a range of from 1:0.9 to 1:2.5. Also, it is preferable that the palladium salt to be subjected to the chelating reaction be selected from palladium salts of aliphatic mono-carboxylic acids having 1 to 5 carbon atoms and palladium nitrate. The palladium chelate salt is composed of one palladium atom and one or two 1,10-phenanthroline or 2,2'-bipyridyl molecules.

In the method of the present invention, the catalyst is preferably used in an atomic number of palladium of from 0.0001 to 0.1, more preferably, from 0.002 to 0.01, per molecule of the orthophthalic diester.

The oxidative coupling reaction in the method of the present invention may be carried out in the presence of at least one organic copper salt. The organic copper salt is effective for preventing the palladium from being deposited in the form of palladium black from the oxidative coupling reaction mixture, even when the molecular oxygen-containing atmosphere has a low partial pressure of oxygen. Therefore, in the case where the partial pressure of oxygen in the oxidative coupling reaction system is low, the organic copper salt is effective for stabilizing the oxidative coupling reaction.

The organic copper salt is preferably selected from the group consisting of copper salts of aliphatic carboxylic acids having 1 to 5 carbon atoms, for instance, copper formate, copper acetate, copper propionate, and copper oxalate, and; copper chelate salts of $\beta$-diketones, for example, acetylacetone and benzoylacetone. Usually, the organic copper salt is used in a molar amount of from 0.5 to 10 times that of the palladium salt or the palladium chelate salt.

In the method of the present invention, the oxidative coupling reaction is preferably carried out at a temperature of from 50° to 300° C., more preferably, from 100° to 230° C., under a pressure of from 1 to 300 atmospheres, more preferably, from 2 to 100 atmospheres. When the oxidative coupling reaction temperature is lower than 50° C., sometimes, the oxidative coupling reaction occurs to a very poor extent. Also, an oxidative coupling reaction temperature higher than 300° C. sometimes causes undesirable side-reactions to vigorously occur and the yield of the desired biphenyl compounds to become remarkably poor.

The oxidative coupling operation in the method of the present invention is carried out in an atmosphere containing molecular oxygen gas. The oxygen-containing atmosphere may consist of pure oxygen gas. However, in order to prevent dangerous accidents, for example, an explosion, it is preferable that the oxygen-containing atmosphere consist of a mixture gas containing a molecular oxygen gas and an inert gas, for instance, nitrogen gas and carbon dioxide gas.

It is preferable that the molecular oxygen-containing atmosphere have a partial pressure of oxygen of from 0.05 to 200 atmospheres, more preferably, from 0.1 to 50 atmospheres. When no organic copper salt is contained in the oxidative coupling reaction system, it is preferable that the partial pressure of oxygen in the system be at least 2 atmospheres, more preferably, 3 or more atmospheres, and still more preferably, from 5 to 100 atmospheres.

In the method of the present invention, the oxidative coupling mixture must not contain a large amount of certain kinds of organic compounds, for example, dimethylsulfoxide, dimethylformamide, acetonitrile and acetic acid, and inorganic compounds, for example, water. However, it is allowable for the reaction mixture to contain a large amount of a reaction medium consisting of at least one member selected from the group consisting of liquid organic acid esters, for instance, ethylene glycol diacetate and methyl adipate, and; liquid ketone compounds, for instance, n-butylmethylketone, ethylmethylketone and isopropylethylketone. When the organic acid ester and/or the ketone compounds are used as a reaction medium, sometimes the yield of the biphenyl compounds is increased. However, use of the above-mentioned reaction medium can be dispensed with.

Also, in the method of the present invention, it is not suitable for the oxidative coupling reaction for the reaction mixture to contain certain kinds of inorganic compounds, for example, sodium acetate, lithium chloride, potassium sulfide and sulfuric acid, even in a small amount. However, it is allowable for the reaction mixture to contain a $\beta$-diketone compounds, for instance, acetylacetone and benzoylacetone, and an organic peroxide compound, for instance, t-butyl peroxide, t-butylhydroxyperoxide and t-butylbenzoate. The above-mentioned -diketone and organic peroxide compounds are effective for promoting the oxidation-coupling reaction of the orthophthalic diester. Usually, the $\beta$-diketone compound is preferably used in a molar amount of 0.5 to 10 times, more preferably, from 0.5 to 4 times, that of the palladium salt or chelate salt. Also, it is preferable that the organic peroxide compound be used in a molar amount of from 2 to 10 times that of the palladium salt or chelate salt.

In the method of the present invention, the oxidative coupling operation may be carried out by blowing a molecular oxygen-containing gas into the oxidative coupling system to bring the molecular oxygen into contact with the orthophthalic diester and the catalyst. The molecular oxygen-containing gas may consist of pure oxygen alone. However, the molecular oxygen-containing gas may consist of at least 0.1% by volume, preferably, from 0.1 to 90% by volume, more preferably, from 1 to 80% by volume, of oxygen gas and the balance consist of an inert gas such as nitrogen gas and carbon dioxide. Also, in order to prevent dangerous accidents, for example, an explosion of the oxidative coupling system, it is preferable that the molecular oxygen-containing gas consist of from 0.5 to 60% by volume, more preferably, from 0.5 to 25% by volume, still more preferably, from 1 to 20% by volume, of oxygen gas and the balance consist of the inert gas. The molecular oxygen-containing gas may be natural air or a mixture of air with the inert gas or oxygen gas.

The molecular oxygen-containing gas may be blown into the oxidative coupling reaction system in any manner as long as the oxygen is effectively brought into contact with the orthophthalic diester and the catalyst in the reaction mixture. For example, the molecular oxygen-containing gas flows along and/or toward the surface of the reaction mixture contained in a vessel. Otherwise, the molecular oxygen-containing gas is blown into the reaction mixture through one or more blowing nozzles or a perforated plate located below the surface of the reaction mixture contained in a vessel. When the reaction mixture flows through a reaction tube, the molecular oxygen-containing gas may be blown into the reaction tube through at least one hole formed on the peripheral wall of the reaction tube. Otherwise, the molecular oxygen-containing gas may flow coccurrently with the reaction mixture through the reaction tube.

When the molecular oxygen-containing gas is blown into the reaction mixture, the molecular oxygen-containing gas is mixed in the form of a number of bubbles with the reaction mixture. This type of mixing is most effective for promoting the contact of the oxygen gas with the orthophthalic diester and the catalyst in the reaction mixture. It is preferable that the flow rate of the molecular oxygen-containing gas be in a range of from 1 to 20 liters (under a standard condition, that is, at a temperature of 25° C. and a pressure of 1 atmosphere) per minute per liter of the reaction mixture. The blowing of the molecular oxygen-containing gas into the oxidative coupling system is advantageous in that the depositing of palladium as a palladium black from the reaction mixture can be prevented even if the partial pressure of oxygen is 5 atmospheres or less. That is, by blowing the molecular oxygen-containing gas into the oxidative coupling reaction system, it becomes possible to restrict the production of undesirable by-products and to increase the yield of the desired S-BPTT, even under a partial pressure of oxygen of from 0.1 to 5 atmospheres.

The method of the present invention is advantageous in that the orthophthalic diester can be converted into biphenyltetracarboxylic tetraesters with a high degree of conversion thereof and the desired S-BPTT can be produced with a high degree of selectivity thereto. That is, the oxidative coupling product from the method of the present invention contains 3,3',4,4'-biphenyltetracarboxylic tetraester (S-BPTT) and 2,3,3',4'-biphenyltetracarboxylic tetraester (a-BPTT), which is in a molar amount of 0.6 times or less, usually, from 0.01 to 0.5 times, that of the 3,3',4,4'-biphenyltetracarboxylic tetraester (S-BPTT).

After the oxidative coupling reaction is completed, palladium in the reaction mixture is preferably recovered by any conventional method. For example, hydrogen gas is blown into the reaction mixture to reduce the palladium compound into metallic palladium, while allowing the resultant metallic palladium to precipitate from the reaction mixture. The precipitate of the metallic palladium can be easily separated from the reaction mixture. In another method, a reducing agent, for example, sodium hydrogen carbonate, is added to the reaction mixture to precipitate metallic palladium. The precipitate of metallic palladium can be recovered from the reaction mixture by means of filtration.

Thereafter, the desired 3,3',4,4'-biphenyltetracarboxylic tetraester can be isolated from the reaction mixture by a conventional method, for example, distillation or crystallization.

The 3,3',4,4'-biphenyltetracarboxylic tetraester produced by the above-mentioned method can be converted to 3,3',4,4'-biphenyltetracarboxylic acid by a conventional method, for example, by hydrolyzing it at an elevated temperature under an increased pressure, or by hydrolyzing it with an acid or alkali. The 3,3'4,4'-biphenyltetracarboxylic acid can be converted to 3,3',4,4'-biphenyl tetracarboxylic dianhydride by heating. The 3,3',4,4'-biphenyltetracarboxylic dianhydride is useful as a material for producing an aromatic polyimide resin.

The specific examples presented below will serve to more fully explain how the present invention is practiced. However, it will be understood that these examples are only illustrative and in no way limit the scope of the present invention.

In the examples, the composition of reaction mixture was determined by means of gas chromatography. From the result of the gas chromatographic analysis, the amounts of 2,3,3',4'-biphenyltetracarboxylic tetraester (a-BPTT) and 3,3',4,4'-biphenyltetracarboxylic tetraester (S-BPTT) and by-products (pitch-like substance having a high boiling point) were calculated.

A percent of conversion of an orthophthalic diester, a percent of yield of a product and a percent of selectivity to a product were calculated in accordance with the following equation.

$$\text{Percent of conversion of o-phthalic diester used} = \frac{\text{Amount (g) of o-phthalic diester converted}}{\text{Amount (g) of o-phthalic diester used}} \times 100$$

$$\text{Percent of yield of a product} = \frac{\text{Amount (g) of a product}}{\text{Amount (g) of o-phthalic diester used}} \times 100$$

$$\text{Percent of selectivity to a product} = \frac{\text{Amount (g) of a product}}{\text{Total amount (g) of all products}} \times 100$$

EXAMPLE 1

A stainless steel autoclave having a capacity of 270 ml was charged with 425 millipoles (70 ml) of dimethyl orthophthalate and, then, with 0.42 millimoles (0.094 g) of palladium acetate [Pd (O.CO.CH$_3$)$_2$] and 0.42 millimoles (0.083 g) of 1,10-phenanthroline monohydrate, and then, closed. The pressure in the inside of the autoclave was increased to 30 atmospheres by blowing compressed air thereinto and the temperature of the reaction system in the autoclave was elevated to 200° C., and then, maintained at this level for five hours to carry out an oxidative coupling operation for the dimethyl orthophthalate. At the begining of the oxidative coupling operation, the partial pressure of oxygen in the reaction system was 10 atmospheres.

After the oxidative coupling reaction was completed the resultant reaction mixture was subjected to a gas chromatographic analysis. As a result of the analysis, it was found that the reaction product contained 0.238 g of 2,3,3',4'-biphenyltetracarboxylic tetramethylester, which corresponded to a yield of 147% based on the palladium used, and; 2.335 g of 3,3',4,4'-biphenyltetracarboxylic tetramethylester, which corresponded to a yield of 1440% based on palladium used. The molar ratio of the resultant a-BPTT to the resultant S-BPTT was 0.10:1.

In order to recover palladium, hydrogen gas was blown into the reaction mixture at a temperature of 200° C., under a pressure of 5 atmospheres on the gauge, for two hours, while allowing the resultant metallic palladium to precipitate from the reaction mixture, and then, the precipitated metallic palladium was removed from the reaction mixture by means of filtration. The amount of the recovered metallic palladium corresponded to about 95% of the amount of palladium contained in the reaction mixture. After the recovery of the metallic palladium, it was found that the content of palladium in the residual reaction mixture was 2.9 ppm or less.

The residual reaction mixture was subjected to a distillation to remove non-reacted dimethyl orthophthalate at a temperature of 110° C. under a pressure of 2 mmHg, and, then, to recover 3,3',4,4'-biphenyltetracarboxylic tetramethyl ester at a temperature of 140° to 270° C. under a pressure of 2 mmHg. Thereafter, the resultant fraction containing 3,3',4,4'-biphenyltetracarboxylic tetramethylester was subjected to a recrystallizing operation by using methyl alcohol. The recrystallized 3,3',4,4'-biphenyltetracarboxylic tetramethylester having degree of purity of 98% or more, was obtained in an recovery yield of 80% or more.

EXAMPLE 2

A solution of 1.01 g of 1,10-phenanthroline in 100 ml of benzene was mixed with another solution of 1.12 g of palladium acetate [Pd (O.CO.CH$_3$)$_2$] in 100 ml of benzene, and the mixed solution was stirred for one hour, while allowing the resultant chelate salt to precipitate from the mixed solution. The precipitated chelate salt was separated from the mixed solution by means of filtration, washed with 100 ml of benzene and, then, dried within a temperature range of from 80° to 90° C., under a reduced pressure, for five hours. 1.84 g of the chelate salt were obtained.

An elementary analysis of the chelate salt showed carbon: 47.33%, hydrogen: 3.34%, nitrogen: 6.80% and palladium: 26.05%.

The same procedures as those described in Example 1 were carried out, except that 0.42 millimoles (0.170 g) of the above-mentioned chelate salt were used as a catalyst, in place of the mixture of 1,10-phenanthroline and palladium acetate. The resultant product contained 0.280 g of 2,3,3',4'-biphenyltetracarboxylic tetramethylester (a-type compound) which corresponded to a yield of 173% based on palladium used, and 2.101 g of 3,3',4,4'-biphenyltetracarboxylic tetramethylester (S-type compound), which corresponded to a yield of 1300% based on palladium used. The molar ratio of the a-type compound to the S-type compound was 0.13:1.

COMPARISON EXAMPLE 1

The same procedures as those described in Example 1 were carried out, except that no 1,10-phenanthroline was used.

The resultant reaction product contained 0.717 g of the a-type compound (a yield of 44.2% based on palladium used) and 0.151 g of the S-type compound (a yield of 93% based on palladium used). The molar ratio of the a-type compound to the S-type compound was 4.75:1.

EXAMPLE 3

The same procedures as those described in Example 1 were carried out, except that the oxidative coupling reaction temperature was changed from 200° C. to 180° C.

The reaction product contained 0.053 g of the a-type compound (a yield of 33% based on palladium used) and 1.067 g of the S-type compound (a yield of 658% based on palladium used). The molar ratio of the a-type compound to the S-type compound was 0.050:1.

EXAMPLE 4

The same procedures as those described in Example 1 were carried out, except that the 1,10-phenanthroline was replaced by 0.42 millimoles (0.066 g) of 2,2'-bipyridyl, and after elevating the temperature of the reaction mixture to 200° C., the oxidative coupling reaction was carried out at this temperature for two hours. The reaction products contained 0.181 g of the a-type compound (a yield of 112% based on palladium used), and 1.176 g of the S-type compound (a yield of 725% based on palladium used). The molar ratio of the a-type compound to the S-type compound was 0.15:1.

EXAMPLE 5

The same procedures as those described in Example 4 were carried out, except that the oxidative coupling reaction was carried out at a temperature of 180° C. for five hours. The reaction product contained 0.110 g of the a-type compound (a yield of 68% based on palladium used) and 1.097 g of the S-type compound (a yield of 677% based on palladium used). The molar ratio of the a-type compound to the S-type compound was 0.10:1.

EXAMPLE 6

The same chelate salt-producing procedures as those described in Example 2 were carried out, except that 1,10-phenanthroline was replaced by 2,2'-bipyridyl. The same oxidation-coupling procedures as those described in Example 5 were carried out, except that the catalyst consisting of the mixture of palladium acetate and 2,2'-bipyridyl was replaced by a catalyst consisting of the above-mentioned chelate salt. The reaction product contained 0.224 g of the a-type compound (a yield of 138% based on palladium used) and 1.441 g of the S-type compound (a yield of 889% based on palladium used). The molar ratio of the a-type compound to the S-type compound was 0.16:1.

EXAMPLE 7

A three-necked glass flask having a capacity of 300 ml was charged with 608 millimole (100 ml) of dimethyl orthophthalate and, then, with 1.20 millimoles (0.269 g) of palladium acetate [Pd (O.CO.CH$_3$)$_2$], 1.2 millimoles (0.240 g) of copper acetate monohydrate [Cu (O.CO.CH$_3$)$_2$.H$_2$O] and 1.2 millimole (0.238 g) of 1,10-phenanthroline, to prepare a reaction mixture. The reaction mixture was heated at a temperature of 140° C. by placing the flask on an oil bath, and bubbled by air blown thereinto at a flow rate of 300 ml (which was a value under one atmosphere at a temperature of 25° C.) per minute, for seven hours. The reaction product contained 0.17 g of the a-type compound (a yield of 37% based on palladium used) and 2.19 g of the S-type compound (a yield of 473% based on palladium used). The molar ratio of the a-type compound to the S-type compound was 0.08:1.

EXAMPLE 8

The same procedures as those described in Example 7 were carried out, except that the same chelate salt as that described in Example 2 was used as a catalyst in place of the catalyst consisting of palladium acetate and 1,10-phenanthroline. The reaction product contained 0.19 g of the a-type compound (a yield of 41% based on palladium used) and 2.25 g of the S-type compound (a yield of 486% based on palladium used). The molar ratio of the a-type compound to the S-type compound was 0.08:1.

EXAMPLE 9

The same procedures as those described in Example 7 were carried out, except that 1,10-phenanthroline was replaced by 2,2'-bipyridyl. The reaction product contained 0.31 g of the a-type compound (a yield of 67% based on palladium used) and 2.04 g of the S-type compound (a yield of 440% based on palladium used). The molar ratio of the a-type compound to the S-type compound was 0.15:1.

EXAMPLE 10

The same procedures as those described in Example 9 were carried out, except that the same chelate salt as that described in Example 6 was used as a catalyst in place of the mixture of palladium acetate and 2,2'-bipyridyl.

The reaction product contained 0.30 g of the a-type compound (a yield of 65% based on palladium used) and 1.88 g of the S-type compound (a yield of 406% based on palladium used). The molar ratio of the a-type compound to the S-type compound was 0.16:1.

EXAMPLE 11

The same procedures as those described in Example 7 were carried out, except that the oxidative coupling temperature was changed from 140° C. to 160° C. The reaction product contained 0.24 g of the a-type compound (a yield of 52% based on palladium used) and 2.58 g of the S-type compound (a yield of 557% based on palladium used). The molar ratio of the a-type compound to the S-type compound was 0.10:1.

EXAMPLE 12

The same procedures as those described in Example 1 were carried out, except that 1,10-phenanthroline was used in an amount of 0.378 millimoles (0.075 g). The resultant product contained 0.89 g of the a-type compound (a yield of 549% based on palladium used) and 1.51 g of the S-type compound (a yield of 931% based on palladium used). The molar ratio of the a-type compound to the S-type compound was 0.59:1.

COMPARISON EXAMPLE 2

The same procedures as those described in Example 3 were carried out, except that 1,10-phenanthroline was used in an amount of 0.21 millimoles (0.042 g). The resultant product contained 5.407 g of the a-type compound (a yield of 3340% based on palladium used) and 1.282 g of the S-type compound (a yield of 791% based on palladium used). The molar ratio of the a-type compound to the S-type compound was 4.23:1.

COMPARISON EXAMPLE 3

The same procedures as those mentioned in Comparison Example 2 were carried out, except that 2,2'-bipyridyl was used instead of 1,10-phenanthroline. The reaction product contained 5.38 g of the a-type compound (a yield of 3320% based on palladium used) and 1.51 g of the S-compound (a yield of 931% based on palladium used). The molar ratio of the a-type compound to the S-type compound was 3.56:1.

EXAMPLES 13 THROUGH 23 AND COMPARISON EXAMPLE 4

In each of Examples 13 through 23, a stainless steel reaction vessel having a capacity of 500 ml was charged with 295 g (250 ml, 1.52 moles) of dimethyl orthophthalate, and then, with palladium acetate [Pd (O.-CO.CH$_3$)$_2$] and 1,10-phenanthroline monohydrate, each in an amount as indicated in Table 1, to prepare a reaction mixture. The reaction mixture was heated to a temperature as indicated in Table 1, and compressed air was blown into the heated reaction mixture through the bottom of the reaction vessel for seven hours, while maintaining the reaction pressure, the partial pressure of oxygen, the supply rate of the compressed air and the reaction temperature at values as indicated in Table 1, and while stirring the reaction mixture by rotating stirring paddles at a rotation velocity of 300 r.p.m.

After the above-mentioned oxidative coupling operation was completed, the reaction mixture was subjected to a gas chromatographic analysis. As a result of the analysis, it was found that the percents of yield of and selectivity to the resultant a-type compound, S-type compound and by-product having a high boiling point were as indicated in Table 1. Table 1 also shows the percent of conversion of dimethyl orthophthalate in each example.

In Comparison Example 4, the same procedures as those described in Example 13 were carried out, except that no 1,10-phenanthroline was used.

The results are shown in Table 1.

TABLE 1

| Item | \multicolumn{11}{c}{Example No.} | Comparison Example |
|---|---|---|---|---|---|---|---|---|---|---|---|---|
| | 13 | 14 | 15 | 16 | 17 | 18 | 19 | 20 | 21 | 22 | 23 | 4 |
| Oxidation-coupling reaction | | | | | | | | | | | | |
| Amount of palladium acetate (m mol) | 3.00 | 3.00 | 3.00 | 3.00 | 3.00 | 3.00 | 6.00 | 3.00 | 3.00 | 3.00 | 1.50 | 3.00 |
| Amount of 1,10-phenanthroline (m mol) | 2.25 | 3.00 | 3.75 | 4.50 | 3.00 | 3.00 | 6.00 | 3.00 | 3.00 | 3.00 | 1.50 | 0 |
| Reaction pressure on the gauge (atm) | 5 | 5 | 5 | 5 | 10 | 20 | 5 | 5 | 5 | 10 | 10 | 5 |
| Partial pressure of oxygen (atm) | 1.2 | 1.2 | 1.2 | 1.2 | 2.2 | 4.2 | 1.2 | 1.2 | 1.2 | 2.2 | 2.2 | 1.2 |
| Supply rate[*]1 of air (l/min.) | 1 | 1 | 1 | 1 | 2 | 3 | 2 | 1 | 1 | 2 | 2 | 1 |
| Reaction temperature (°C.) | 200 | 200 | 200 | 200 | 200 | 200 | 200 | 180 | 160 | 180 | 180 | 200 |
| Conversion of DMP[*]2 (%) | 6.20 | 8.61 | 8.74 | 4.45 | 8.98 | 8.90 | 14.06 | 5.51 | 3.60 | 5.40 | 4.03 | 3.37 |
| Yield and selectivity of product | | | | | | | | | | | | |

TABLE 1-continued

|  |  |  |  | Example No. |  |  |  |  |  |  |  |  |  | Comparison Example |
|---|---|---|---|---|---|---|---|---|---|---|---|---|---|---|
| Item |  |  |  | 13 | 14 | 15 | 16 | 17 | 18 | 19 | 20 | 21 | 22 | 23 | 4 |
| a-type[*]3 | compound | Yield | (%) | 0.4 | 0.4 | 0.1 | 0.1 | 0.6 | 0.7 | 0.7 | 0.3 | 0.2 | 0.2 | 0.2 | 0.6 |
|  |  | Selectivity | (%) | 6 | 5 | 1 | 2 | 6 | 8 | 5 | 5 | 4 | 4 | 5 | 17 |
| S-type[*]4 | compound | Yield | (%) | 5.2 | 7.6 | 7.6 | 3.5 | 7.3 | 6.1 | 11.1 | 4.5 | 2.6 | 4.2 | 3.5 | 0.3 |
|  |  | Selectivity | (%) | 84 | 88 | 87 | 80 | 82 | 68 | 79 | 82 | 73 | 79 | 87 | 8 |
| By-product |  | Yield | (%) | 0.6 | 0.7 | 1.0 | 0.8 | 1.1 | 2.1 | 2.3 | 0.7 | 0.8 | 0.9 | 0.3 | 2.5 |
|  |  | Selectivity | (%) | 10 | 7 | 11 | 18 | 12 | 24 | 16 | 13 | 23 | 17 | 8 | 75 |

Note
[*]This value is under one atmosphere at a temperature of 25° C.
[*]2 Dimethyl orthophthalate
[*]3 2,3,3',4'-biphenyltetracarboxylic tetramethylester
[*]4 3,3',4,4'-biphenyltetracarboxylic tetramethylester

EXAMPLE 24 THROUGH 28

In Example 24, the same procedures as those described in Example 22, were carried out, except that 2,2'-bipyridyl was used in place of 1,10-phenanthroline.

In Example 25, the same procedures as those described in Example 24 were carried out, except that 2,2'-bipyridyl was used in an amount of 3.75 millimoles.

In Example 26, the same procedures as those described in Example 14 were carried out, except that 1,10-phenanthroline was replaced by 2,2'-bipyridyl.

In Example 27, the same procedures as those described in Example 24 were carried out, except that the reaction pressure was changed to 5 atmospheres and the supply rate of air was changed to 1 liter/min.

In Example 28, the same procedures as those mentioned in Example 24 were carried out, except that the reaction temperature was changed to 200° C.

The results of Examples 24 through 28 are indicated in Table 2.

TABLE 2

|  |  | Example No. |  |  |  |  |
|---|---|---|---|---|---|---|
| Item |  | 24 | 25 | 26 | 27 | 28 |
| Oxidation-coupling reaction |  |  |  |  |  |  |
| Amount of palladium acetate (m mol) |  | 3.00 | 3.00 | 3.00 | 3.00 | 3.00 |
| Amount of 2,2'-bipyridyl (m mol) |  | 3.00 | 3.75 | 3.00 | 3.00 | 3.00 |
| Reaction pressure on the gauge (atm) |  | 10 | 10 | 5 | 5 | 10 |
| Partial pressure of oxygen (atm) |  | 2.2 | 2.2 | 1.2 | 1.2 | 2.2 |
| Supply rate of air (l/min.) |  | 2 | 2 | 1 | 1 | 2 |
| Reaction temperature (°C.) |  | 180 | 180 | 200 | 180 | 200 |
| Conversion of DMP (%) |  | 6.44 | 6.08 | 6.10 | 6.50 | 6.25 |
| Yield and selectivity of product |  |  |  |  |  |  |
| a-type compound | Yield (%) | 0.5 | 0.4 | 0.5 | 0.5 | 0.6 |
|  | Selectivity (%) | 7 | 7 | 8 | 7 | 9 |
| S-type compound | Yield (%) | 5.7 | 5.4 | 4.8 | 5.7 | 4.9 |
|  | Selectivity (%) | 88 | 89 | 79 | 88 | 79 |
| By-product | Yield (%) | 0.3 | 0.3 | 0.8 | 0.3 | 0.8 |
|  | Selectivity (%) | 5 | 4 | 13 | 5 | 12 |

EXAMPLE 29

A palladium chelate salt was prepared by the following procedures. A solution of 1.01 g of 1,10-phenanthroline monohydrate dissolved in 100 ml of benzene was mixed with another solution of 1.12 g of palladium acetate [Pd (O.CO.CH$_3$)$_2$] dissolved in 100 ml of benzene. The mixed solution was stirred at a temperature of 25° C. for one hour. The resultant precipitate was separated from the mixed solution by means of filtration, washed with 100 ml of benzene and, finally, dried at a temperature of from 80° to 90° C., under a reduced pressure, for five hours. The amount of the palladium chelate salt was 1.84 g. An elementary analysis of the palladium chelate showed 47.33% of carbon, 3.34% of hydrogen, 6.80% of nitrogen and 26.05% of palladium. The same oxidative coupling procedures as those described in Example 13 were carried out, except that 3.00 millimoles (1.214 g) of the above-described palladium chelate salt were used as a catalyst instead of the mixture of palladium acetate and 1,10-phenanthroline, and the reaction was continued for ten hours.

The degree of conversion of dimethyl orthophthalate was 7.81%, the yield of and the selectivity to the resultant a-type compound were 0.4% and 5%, respectively, the yield of and the selectivity to the resultant S-type compound were 6.9% and 88%, respectively, and yield of and the selectivity to the by-product having a high boiling point, were 0.5% and 7%, respectively.

EXAMPLE 30

A mixture of 3.00 millimoles of palladium acetate, and 3.00 millimoles of 1,10-phenanthroline with 250 ml of dimethyl orthophthalate was stirred at a temperature of 80° C. for 15 minutes. A solution of the resultant palladium chelate salt dissolved in dimethyl orthophthalate was obtained. The obtained solution was placed in the same reaction vessel as that described in Example 13, the oxidation-coupling operation was carried out at a temperature of 180° C., under a pressure of 5 atmospheres (a partial pressure of oxygen of 1.2 atmosphere), for seven hours, while stirring the solution by rotating stirring paddles at a rotating speed of 300 r.p.m. and while blowing air into the reaction vessel at a supply rate of 1 liter/min. through the bottom of the reaction vessel.

The degree of conversion of dimethyl orthophthalate was 6.39%, the yield of and the selectivity to the resultant a-type compound were 0.3% and 5%, respectively, the yield of and the selectivity to the resultant S-type compound were 5.2% and 81%, respectively, and the yield of and the selectivity to the by-product having a high boiling point were 0.9% and 14%, respectively.

EXAMPLES 31 THROUGH 35

In the Examples 31 through 34, the same procedures as those mentioned in Example 22 were carried out, except that a mixed gas consisting of nitrogen and oxygen in a composition as indicated in Table 3 was used as a molecular oxygen-containing gas, and the reaction pressure, the partial pressure of oxygen and the reaction temperature were those indicated in Table 3.

In Example 35, a palladium chelate salt was prepared by stirring a mixture of a solution of 0.80 g of 2,2'--bipyridyl dissolved in 100 ml of benzene with another solution of 1.12 g of palladium acetate dissolved in 100 ml of benzene, at a temperature of 25° C. for about one hour. The resultant precipitate was separated from the mixture by means of filtration, washed with 100 ml of benzene and, then, dried. The amount of the resultant palladium chelate salt was 1.70 g. The same oxidation-coupling procedures as those described in Example 31 were carried out, except that 1.5 millimoles (0.517 g) of the obtained palladium chelate salt were used as a catalyst instead of the mixture of palladium acetate and 1,10-phenanthroline.

The results of Examples 31 through 35 are indicated in Table 3.

In Example 37, a stainless steel reaction vessel having a capacity of 100 ml was charged with 59 g (50 ml, 0.304 millimoles) of dimethyl orthophthalate and 0.6 millimoles of a chelate salt consisting of one molecule of palladium orthophthalate and one molecule of 1,10-phenanthroline. The reaction mixture was subjected to an oxidation-coupling reaction at a temperature of 180° C., under a pressure of 10 atmospheres on the gauge, for seven hours, while blowing a mixture gas of 10% by volume of oxygen and 90% by volume of nitrogen at a supply rate of 0.4 liter/min. through the bottom of the reaction vessel, and while stirring the reaction mixture with stirring paddles at a rotation speed of 300 r.p.m.

In Example 38, a stainless steel reaction vessel having a capacity of 500 ml was charged with 0.3 millimoles of a chelate salt consisting of one molecule of palladium orthophthalate and one molecule of 2,2'-bipyridyl. The thus prepared reaction mixture was subjected to an oxidation-coupling reaction at a temperature of 200° C., under a pressure of 10 atmospheres on the gauge, for seven hours, while blowing a mixture gas consisting of 90% by volume of nitrogen and 10% by volume of oxygen at a supply rate of 0.5 liter/min. through the bottom of the vessel, and while stirring the reaction mixture with stirring paddles at a rotation speed of 1000 r.p.m.

In each of the Examples 39 through 42, the same procedures as those described in Example 38 were carried out, except that the palladium chelate salt consisted of one molecule of palladium nitrate and two molecules of 2,2'-bipyridyl in Example 39, one molecule of palladium nitrate and two molecules of 1,10-phenanthroline in Example 40, one molecule of palladium nitrate and one molecule of 2,2'-bipyridyl in Example 41 and one molecule of nitrate-acetatepalladium and one molecule of 2,2'-bipyridyl in Example 42.

The results of Examples 36 through 42 are indicated in Table 4.

TABLE 3

| Item | 31 | 32 | 33 | 34 | 35 |
|---|---|---|---|---|---|
| Oxidation-coupling reaction | | | | | |
| Reaction pressure on the gauge (atm) | 10 | 5 | 5 | 5 | 10 |
| Partial pressure of oxygen (atm) | 1.1 | 0.55 | 0.55 | 0.30 | 1.1 |
| Content of oxygen Molecular oxygen-(% by volume) | 10 | 10 | 10 | 5 | 10 |
| containing gas Supply rate (l/min) | 2 | 2 | 0.5 | 2 | 2 |
| Reaction temperature (°C.) | 180 | 180 | 180 | 180 | 180 |
| Degree of conversion of DMP (%) | 4.83 | 4.94 | 4.71 | 5.67 | 3.92 |
| Yield of and selectivity to product | | | | | |
| a-type compound Yield (%) | 0.2 | 0.2 | 0.2 | 0.3 | 0.3 |
| Selectivity (%) | 4 | 4 | 5 | 5 | 8 |
| S-type compound Yield (%) | 3.8 | 3.9 | 3.9 | 4.8 | 3.4 |
| Selectivity (%) | 79 | 78 | 82 | 84 | 88 |
| By-product Yield (%) | 0.8 | 0.9 | 0.6 | 0.7 | 0.2 |
| Selectivity (%) | 17 | 18 | 13 | 12 | 4 |

EXAMPLES 36 THROUGH 42

In Example 36, the same procedure as those described in Example 1 were carried out, excpet that 0.128 g of bis-acetylacetonatopalladium were used instead of palladium acetate.

TABLE 4

| Example No. | Type of Catalyst | Percent of conversion of DMP | a-type compound | | S-type compound | | By-product compound | |
|---|---|---|---|---|---|---|---|---|
| | | | Yield (%) | Selectivity (%) | Yield (%) | Selectivity (%) | Yield (%) | Selectivity (%) |
| 36 | Mixture of bis-acetyl-acetonatepalladium and 1,10-phenanthroline monohydrate | 1.40 | 0.14 | 10 | 1.20 | 86 | 0.06 | 4 |
| 37 | 1:1 type chelate salt of palladium orthophthalate with 1,10-phenanthroline | 2.34 | 0.11 | 5 | 1.62 | 69 | 0.61 | 26 |
| 38 | 1:1 type chelate salt of | 9.64 | 0.56 | 6 | 5.34 | 55 | 3.74 | 39 |

TABLE 4-continued

| Example No. | Type of Catalyst | Percent of conversion of DMP | a-type compound Yield (%) | a-type compound Selectivity (%) | S-type compound Yield (%) | S-type compound Selectivity (%) | By-product compound Yield (%) | By-product compound Selectivity (%) |
|---|---|---|---|---|---|---|---|---|
|  | palladium orthophthalate with 2,2'-bipyridyl |  |  |  |  |  |  |  |
| 39 | 1:2 type chelate salt of palladium nitrate with 2,2'-bipyridyl | 4.79 | 0.44 | 9 | 3.57 | 75 | 0.78 | 16 |
| 40 | 1:2 type chelate salt of palladium nitrate with 1,10-phenanthroline | 1.54 | 0.05 | 3 | 0.69 | 45 | 0.80 | 52 |
| 41 | 1:1 type chelate salt of palladium nitrate with 2,2'-bipyridyl | 4.13 | 0.50 | 12 | 2.94 | 71 | 0.69 | 17 |
| 42 | 1:1 type chelate salt of nitrato-acetatopalladium with 2,2'-bipyridyl | 4.33 | 0.38 | 9 | 3.42 | 79 | 0.53 | 12 |

EXAMPLE 43

A stainless steel reaction vessel having a capacity of 500 ml was charged with 295 g (250 ml, 1.52 moles) of dimethyl orthophthalate and 2.0 millimoles of a chelate salt consisting of one molecule of palladium acetate and one molecule of 1,10-phenanthroline. The resultant reaction mixture was subjected to an oxidation-coupling reaction at a temperature of 200° C., under a pressure of 10 atmospheres on the gauge, for 2.5 hours, while blowing a mixture gas consisting of 90% by volume of nitrogen and 10% by volume of oxygen at a supply rate of 2 liter/min. through the bottom of the reaction vessel, and while stirring the reaction mixture with stirring paddles at a rotation speed of 800 r.p.m. Thereafter, 0.4 millimoles of 1,10-phenanthroline dissolved in 10 g of dimethyl orthophthalate were added to the reaction mixture and the same oxidative coupling operation as that described above was continued for the mixture for eleven hours.

After the reaction was completed, it was found that the degree of conversion of dimethyl orthophthalate was 9.87%. Also, it was found that the yield of and the selectivity to the a-type compound were 0.42% and 4%, respectively, the yield of and the selectivity to the S-type compound were 7.89% and 80%, respectively, and the yield of and the selectivity to the by-product were 1.56% and 16%, respectively.

We claim:

1. A method for producing biphenyltetracarboxylic esters, comprising oxidative coupling an orthophthalic diester in a molecular oxygen-containing atmosphere in the presence of a catalyst consisting of at least one member selected from the group consisting of (a) mixtures of at least one palladium salt with 1,10-phenanthroline in a molar amount of 0.9 to 4 times that of said palladium salt and (b) chelating reaction products of at least one palladium salt with 1,10-phenanthroline and.

2. A method as claimed in claim 1, wherein said oxidative coupling operation is carried out by blowing a molecular oxygen-containing gas into the oxidative coupling system to bring the molecular oxygen into contact with said orthophthalic diester and said catalyst.

3. A method as claimed in claim 1 or 2, wherein said orthophthalic diester is selected from those of the formula (I):

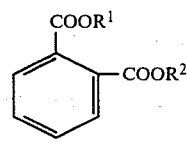

wherein $R^1$ and $R^2$ represent, independently from each other, an alkyl radical having 1 to 4 carbon atoms, respectively.

4. A method as claimed in claim 1, wherein said palladium salt is selected from the group consisting of palladium salts of organic carboxylic acids, palladium chelate salts of β-diketone compounds and palladium salts of inorganic acids.

5. A method as claimed in claim 1, wherein said palladium salt is selected from the group consisting of palladium salts of aliphatic carboxylic acids having 1 to 5 carbon atoms; palladium salts of aromatic carboxylic acids; palladium chelate salts of acetylacetone, benzoylacetone and trifuluoroacetylacetone; and palladium salts of nitric acid, nitrous acid and sulfuric acid.

6. A method as claimed in claim 1, wherein said catalyst is used in an atomic number of palladium of 0.0001 to 0.1 per molecule of said orthophthalic diester.

7. A method as claimed in claim 1, wherein said oxidative coupling reaction is carried out in the presence of at least one organic copper salt.

8. A method as claimed in claim 7, wherein said organic copper salt is selected from the group consisting of copper salts of aliphatic carboxylic acids having 1 to 5 carbon atoms and copper chelate salts of β-diketones.

9. A method as claimed in claim 7, wherein said organic copper salt is used in a molar amount of from 0.5 to 10 times that of said palladium salt or chelate salt.

10. A method as claimed in claim 1, wherein said oxidative coupling reaction is carryed out at a temperature of from 50° to 300° C.

11. A method as claimed in claim 1, wherein said oxidative coupling reaction is carried out under a pressure of from 1 to 300 atmospheres.

12. A method as claimed in claim 1, wherein said oxidative coupling atmosphere, the partial pressure of oxygen is in a range of from 0.05 to 200 atmospehres.

13. A method as claimed in claim 2, wherein said molecular oxygen-containing gas flows in the form of bubbles through said reaction mixture.

14. A method as claimed in claims 2 or 13 wherein the flow rate of said molecular oxygen-containing gas is in a range of from 1 to 20 liters per minute per liter of said reaction mixture.

15. A method as claimed in claim 10, wherein said oxidative coupling reaction is carried out at a temperature of 140°–230° C.

* * * * *

UNITED STATES PATENT AND TRADEMARK OFFICE
CERTIFICATE OF CORRECTION

PATENT NO. : 4,292,435
DATED : September 29, 1981
INVENTOR(S) : Hiroshi Itatani et al.

It is certified that error appears in the above—identified patent and that said Letters Patent is hereby corrected as shown below:

Column 4, line 52: "-diketone" should read --β-diketone--.

Columns 13-14, Table 4: The heading "Percent of Reaction Product" should be inserted.

Column 15, line 55: "and" should be deleted.

Column 16, line 55: "atmospehres" should read --atmospheres--.

Signed and Sealed this

Fifteenth Day of June 1982

[SEAL]

Attest:

GERALD J. MOSSINGHOFF

Attesting Officer

Commissioner of Patents and Trademarks